June 14, 1938.     G. WHEAT     2,120,822
STORAGE BATTERY
Filed June 14, 1935     2 Sheets-Sheet 1

Inventor:
Grant Wheat,
By J. H. McCreely
Attorney.

June 14, 1938.　　　　　G. WHEAT　　　　　2,120,822

STORAGE BATTERY

Filed June 14, 1935　　　　　2 Sheets-Sheet 2

Inventor:
Grant Wheat,
By J. H. McCready,
Attorney.

Patented June 14, 1938

2,120,822

UNITED STATES PATENT OFFICE 2,120,822

STORAGE BATTERY

Grant Wheat, Marlboro, Mass., assignor to Koehler Manufacturing Company, Marlboro, Mass., a corporation of Massachusetts Application June 14, 1935, Serial No. 26,665

13 Claims. (Cl. 136—149)

This invention relates to storage batteries, and is more especially concerned with the type of storage battery used by miners to furnish current for the small electric lamps which they wear on their hats or caps. It will be evident, however, that the invention is not limited to this use but is equally applicable to batteries designed for many other purposes.

For miner's lamps, a battery of the lead-sulphuric acid type is ordinarily used. It is obviously important that such a battery shall have a high efficiency and a high ratio of power output to the weight of the battery. In addition, it is also desirable to so construct the battery that the rush or surge of current created upon an accidental direct short circuit shall be limited. In fact, the Bureau of Mines requires that the batteries used for these purposes either be designed to limit such surges to prescribed values, or that special equipment be used with them to avoid the consequences of the high currents resulting from short circuits.

These desirable features in a battery are in a measure contradictory, or involve requirements that are inconsistent with each other. That is, the high efficiency and high ratio of power output under working conditions calls for a low internal resistance in the battery, while the necessity for limiting the rush of current on a direct short circuit naturally suggests the use of an internal resistance sufficiently high to choke down such a rush or surge. The low internal resistance, however, is an exceedingly important condition for normal operation. It enables the battery to deliver a higher voltage during discharge than otherwise would be possible, to maintain such higher voltage throughout practically the entire discharge period, and thus to give the miner more light, other conditions being equal. In addition, it also improves the ampere hour charging efficiency of the battery.

It is one of the objects of this invention, therefore, to devise a battery in which this highly desirable characteristic shall be combined with those conditions necessary to limit the surge of current on a direct short circuit.

In those batteries subjected to considerable motion, as are the storage batteries carried by a miner, the electrolyte washes the active material away from the surfaces of the plates and thus substantially reduces the life of the battery. There is always a tendency in any battery for a migration of the particles of active material to take place from one plate to another. The motion of the electrolyte contributes to this so-called "shedding" action with a resultant reduction in the useful material left on the plates and also a tendency to bridge the separating space and thus to short circuit the battery. Moreover, most batteries are so constructed that the particles detached from the plates can collect at the bottom of the battery casing, and if an excessive accumulation occurs, it may short circuit the plates at this point.

In order to avoid these difficulties, it is one of the objects of this invention to devise a battery in which substantially the entire body of electrolyte will be held in an absorbed condition. This has been proposed heretofore, but this object has never been realized, so far as I have been able to learn, in any practical storage battery or in one capable of preventing shedding or having the other desirable characteristics above described. To satisfactorily combine these features advantageously is, therefore, a further object of this invention.

The invention involves a novel battery organization, a new method of control of a storage battery, and a unique form of separator.

I have discovered that the desirable conditions of low internal resistance coupled with a moderate and controlled surge upon a direct short circuit can be realized by properly limiting the rate of diffusion of the electrolyte, or the products of electrolysis of the electrolyte. For this purpose use may advantageously be made of the phenomenon of osmosis. In other words, I find it not only possible, but preferable, to use a separator having the physical characteristics of a semi-permeable membrane. Thus the nature of the separator can be made such that the condition of low internal resistance at normal working ranges will be produced, while at the same time so limiting the rate of diffusion of the electrolyte that the surge of current upon a direct short circuit will be controlled within the desired limits and will, in any event, be maintained at a value greatly below that which otherwise would occur. Such control of the electrolyte I believe to be broadly new.

The best material that I have found for this purpose consists of balsa wood. This substance also has the great advantages of being highly absorbent and not readily attacked by the acid electrolyte used in lead storage batteries. Consequently, it fulfils the requirements for the third condition above stated, namely, that of maintaining substantially the entire body of electrolyte in an absorbed condition in the battery, and thus avoiding the necessity for using any substantial volume of free flowing electrolyte.

The invention will be more completely disclosed in connection with the accompanying drawings, in which Fig. 1 is a side view, partly in vertical section, of a storage battery embodying features of this invention;

Figure 2:
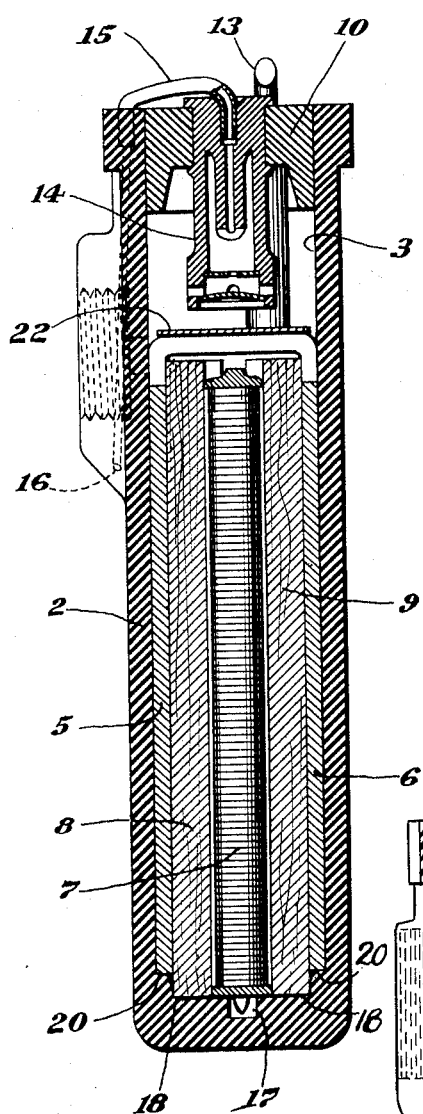
Fig. 2 is a vertical, transverse section through one of the cells of the battery shown in Fig. 1.

The specific construction shown in the drawings is designed with particular reference to the requirements of miner's lamps and similar apparatus of the form shown in certain of my prior patents, as for example, Patent No. 1,757,887, but it will be evident that the invention is equally applicable to other designs of storage batteries. This battery comprises a casing or jar 2, which may conveniently be made of glass, vulcanite, bakelite, various rubber compositions, or other suitable materials well known in this art. As shown, it comprises two cells, indicated at 3 and 4, respectively. Located in the cell 3 are the usual battery elements comprising, in this instance, two negative plates 5 and 6 and a positive plate 7. Preferably the negative plates are of the flat or pasted type, while the positive plate is of the tubular type. Between the positive and negative plates are two separators 8 and 9. A cover 10 of rubber or other suitable material is fitted tightly into the upper end of the cell 3 and the leads 12 and 13 from the positive and negative plates, respectively, are led through this cover. Preferably, also, the cover supports some suitable form of non-spilling device, such as that shown at 14, the vent 15 from this device being led down through the wall of the jar and finding an outlet at the point 16, Fig. 2. Corresponding elements are included in the other cell 4.

Figure 3:
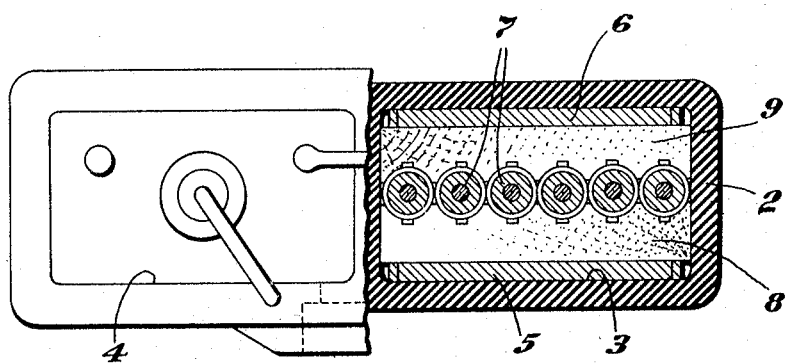
Fig. 3 is a plan view, partly in horizontal section, of the battery.
Figure 4:
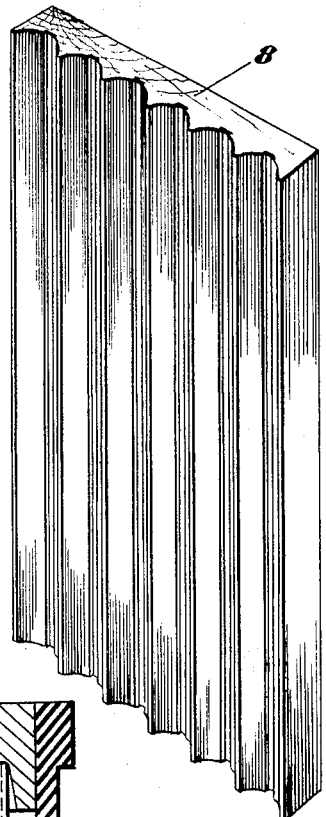
Fig. 4 is a perspective view of a portion of one of the separators.

As above indicated, the separators 8 and 9 preferably are made of balsa wood. If the positive plate is of the tubular type, as shown, while the negative plates are of the flat form, these separators are grooved, as best shown in Figs. 3 and 4, so that the grooved surface of each separator will fit snugly against, and conform to, the surface of the positive plates, while the opposite flat surface will fit in a similar manner against one of the negative plates. By making the plates and the separators of suitable dimensions, these elements can be made to fill substantially the entire cross-sectional area of the cell, as shown for example in Fig. 3, and the space left at the top may be only that required for the very small amount of free electrolyte which may be left in the battery or for filling to replace evaporation. This space and the non-spilling device are useful also in preventing leakage of the solution due to any over-filling of the battery. By making the separators conform to, and fit tightly against, the surfaces of the plates, the necessary volume of electrolyte may be held in contact with them solely by the absorptive properties of the balsa wood to enable the battery to operate without the presence of any free flowing electrolyte.

A surprising and valuable function of this separating material is the fact that it prevents any objectionable migration or shedding of the active material from the plates. Due to the difficulty of producing an exact fit of the separator around the positive plate when it is of a tubular form, a very slight shedding may occur here. To prevent this sediment from touching both the positive and negative plates, I prefer to rest the lower edges of the negative plates on shelves 20—20 raised above the bottom 18 of the jar. This allows the separators to extend down beyond the negative plates and as they press hard against the sides of these shelves they seal off the negative plates and prevent the sediment from reaching them. Consequently, it is unnecessary to provide a mud space in the bottom of the jar. However, small recesses or pockets 17 may be provided to receive the ends of the spines of the positive plate.

Figure 1:
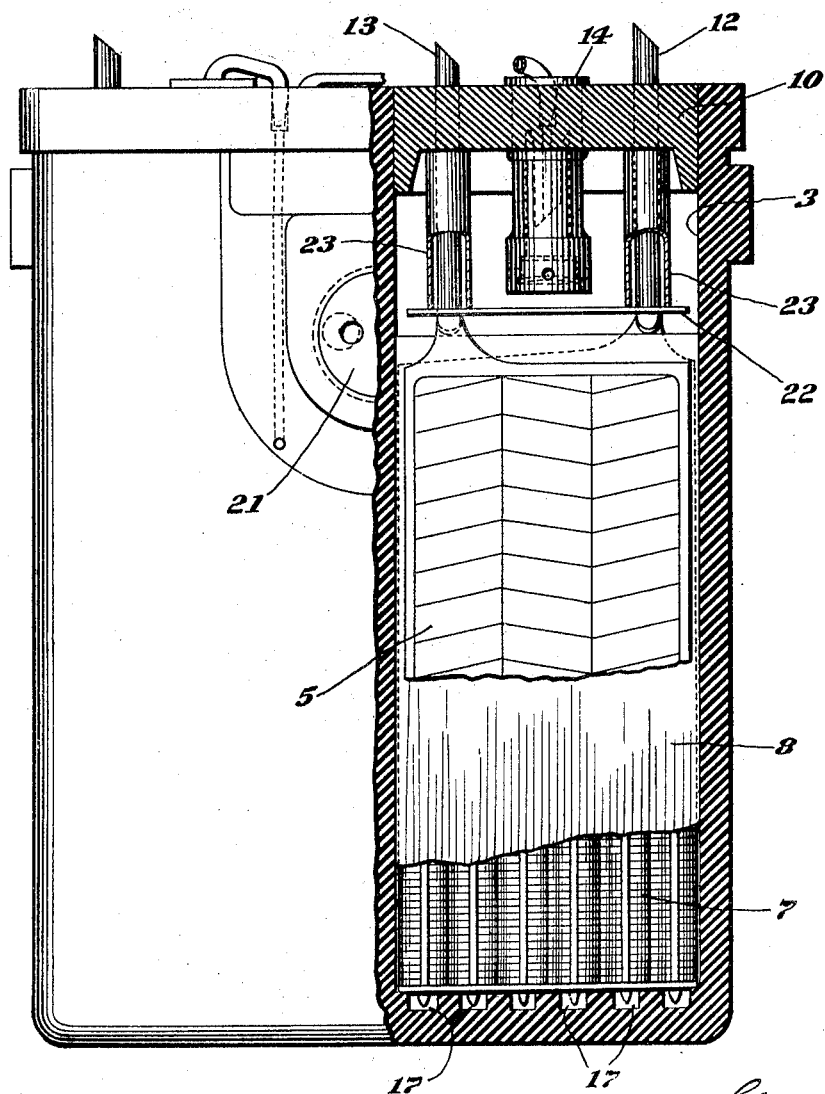
Figure 5:
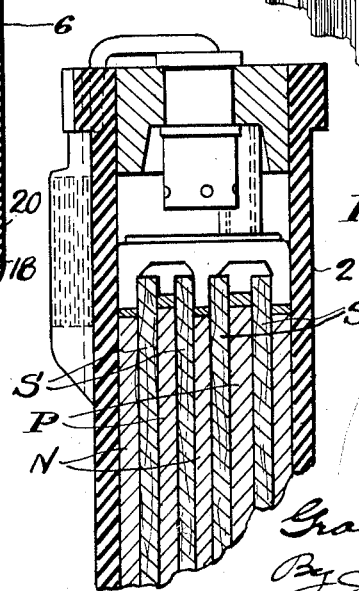
Fig. 5 is a sectional view showing another form of the invention in which pasted plates are used; the bottom being broken away.

Fig. 5 shows the invention as embodied in the pasted plate type of battery, the positive and negative plates being designated at P and N, respectively, and the separators at S. These elements are assembled in a jar 2' of essentially the same construction as that shown in Figs. 1, 2 and 3. In this form of the invention the separators may have plain flat sides, since the surfaces of both sets of plates are flat.

It will be understood that in order to enable the separators to hold the desired volume of electrolyte, they should usually be made somewhat thicker than the ordinary wooden or rubber separators. I prefer to make them in the neighborhood of one-quarter or five-sixteenths of an inch in overall thickness in a construction such as that shown in the drawings. In a pasted plate battery as shown in Fig. 5, the thickness of the separators may be reduced to approximately three-sixteenths of an inch. In both forms, however, the separators preferably are made at least as thick as the plates. Naturally, however, the dimensions will vary with the requirements of individual designs.

Such a battery equipped with balsa wood separators can easily be made to have an internal resistance at least as low as that of batteries of this type and of corresponding dimensions equipped with the best commercial separators of the old types. Also, if proper care is taken in the preparation of the separators, this internal resistance can be made abnormally low. This has definitely been proven in the commercial use of batteries embodying this invention. Comparative tests run with corresponding batteries equipped with separators made of Port Orford cedar have shown a consistently higher terminal voltage for the balsa wood separator battery throughout practically the entire range of discharge. This higher terminal voltage is maintained, other conditions being equal, throughout the life of the battery.

Furthermore, by so preparing the separators that they will have the characteristics of a semi-permeable membrane, a battery equipped with them exhibits a relatively high apparent internal resistance upon a direct short circuit. This apparent resistance may be utilized to control the surge of current which occurs upon a short circuit, and to hold the flow of current under these conditions within the desired limits. For example, a miner's lamp battery, such as that shown in the drawings, gives a direct short-circuit current of approximately thirty-five amperes, whereas the same battery with ordinary separators would generate a short circuit current of considerably over one hundred amperes.

The best explanation that I can give for this action is that at the instant a short circuit discharge takes place, the layers of wood in the separators immediately in contact with and adjacent to the plates are deprived of their electrolyte, or of the products of electrolysis of the electrolyte, consisting of the positive hydrogen ions and the negative SO₄ ions. At this instant an abnormally high percentage of water is present in these layers as the result of the heavy discharge of current and these layers of the separators thus act like relatively high resistances. Thereafter, current can flow only so fast as the water can diffuse into the separators and the ions can migrate to the plates. Thus the diffusion rate permitted by the structure of the separator controls the intensity of the current flow under these conditions. In other words, this characteristic of limited current under short circuit conditions may be said to be due to the inability of the separators to supply charged ions to the plates with which they are in surface contact at a rate sufficient to maintain the high current that would be created if a free flow of electrolyte were permitted. This, in turn, is due to the osmotic phenomena exhibited by the separator under these conditions which prevents the movement of charged ions from the interior to the surface and of the molecules of water away from said surface at such rates as to maintain the equilibrium which always exists in any of the prior forms of storage batteries. While the foregoing theory is believed to be correct, it will be understood that the invention does not depend solely upon this theory and that whether or not it is the correct explanation of the action that takes place, it has been definitely proved that the advantageous results above described are produced by the invention.

The fact that these balsa wood separators do act as semi-permeable membranes between pure water and the sulphuric acid electrolyte of a normal battery strength (1.300 specific gravity) has been determined by experiments made for this express purpose. For example, such a separator, when used as a diaphragm between these liquids in the ordinary osmotic pressure testing apparatus, gives a substantial osmotic pressure and tends to hold that pressure indefinitely, whereas the ordinary forms of storage battery separators do not exhibit any substantial continued osmotic pressure, and, in fact, most of them show no such pressure at all. The very slow diffusion rate of both charged and uncharged ions has also been determined independently of the action in a battery.

A further experimental fact confirming the theory above given is found in the study of the voltage recovery of batteries using different types of separators after severe, but equal, discharge. Batteries equipped with the conventional types of separators show a very rapid initial rate of voltage recovery, whereas those in which balsa wood separators are used recover initially at a slower rate, both finally making the same recovery, thus indicating that the slow rate of diffusion is responsible for the slow initial voltage recovery.

A special treatment of the balsa wood is desirable in order to obtain the best results. This wood naturally contains some acetic acid and other organic constituents which it is desirable to get rid of, care being taken, however, to maintain the structure of the wood substantially uninjured. A good grade of wood preferably is used, and all of the shaping operations preferably should be performed before subjecting the wood to the preparatory treatment. After being so shaped, the separators are boiled in water for five or six hours. This operation carries off the acetic acid and the wood sap, lignin, and other undesirable organic constituents. The addition of a small proportion of an alkaline substance, such as soda ash, to the water facilitates the elimination of these undesirable products and the neutralization of the acid constituents. The alkaline solution so produced, however, should be extremely weak, say one part of soda ash to one hundred and fifty parts of water. Next the water should be drawn off, the container re-filled, and the boiling operation repeated two or three times. Following the final boiling in an alkaline bath, the separators are boiled for two or three hours in a very weak solution consisting of, say, one part of sulphuric acid (1.400 gravity) to ninety parts of water, this boiling step being repeated at least once and the separators then being thoroughly washed in water to remove any salts produced by the neutralization of the soda ash with the acid solution. The separators are then ready to be assembled with the battery plates in the battery jars. Immediately prior to this step, however, it is preferable to soak the separators in a sulphuric acid solution, the specific gravity of which is nearly up to that desired in the finished battery. Such a solution may, for example, have a gravity of 1.280. This soaking operation should be continued until the separators are completely saturated, and they should be assembled in the jar in this condition, the jar then being sealed. The deficiency in gravity of the solution will subsequently be made up in charging. After the initial filling, it is usually necessary to add sufficient solution to the jar to replace that which has been drawn from the separators by the dry plates, and this additional quantity may be introduced through the filler hole which normally is closed by the plug 21. Subsequently, as evaporation occurs in use, distilled water can be introduced through this filling aperture and allowed to penetrate into the separators until they are thoroughly saturated, after which the surplus may be poured off before inserting the filler plug 21.

A battery embodying the various features of this invention has several extremely important advantages as compared with the prior forms of storage batteries. Among these may be mentioned particularly low internal resistance under normal operation, high voltage over practically the entire discharge range, an unusually low surge of current upon a direct short circuit, exceptionally long life of the plates, and elimination of the warping of the plates. In addition, I find it entirely feasible to reduce the dimensions of a battery of a given rating by using this invention, thus effecting a saving in weight and providing a battery more convenient for a miner to use. A further advantage of the use of separators of the character here described is that the rate of evaporation of the solution is reduced very materially so that much of the drying out and sulphating which takes place in a free solution battery is obviated.

While, as above stated, balsa wood is the best material which I have found from which to make separators, some of the advantages of the invention can be produced by using separators made of other materials, especially wood of other species. Balsa is a wood of the family Bombacaceae. This family, which belongs to the order Malvales, contains about twenty genera which are widely distributed in the tropics. These genera include Bombax, Ceiba (or *Bombax ceiba*), Chorisia, Ochroma, and others. Probably the best known of the light woods of this family are the balsa (*Ochroma lagopus*) and the Ceiba. At the present time, however, very few of these woods are available commercially in sufficient quantities to make their use in this relationship practical, balsa being the only one which is imported into this country in any substantial volume. It is believed, however, that woods other than balsa possess the property of acting like a semi-permeable membrane, or affording the very low diffusion rate required to produce the action in a storage battery above described and which is necessary to give essentially the same results as balsa. I have as yet, however, found no species as satisfactory as balsa.

The battery shown may conveniently be equipped with the usual Celluloid or rubber plate 22 resting on the upper surfaces of the horizontal section of the lead wires 12 and 13 and the vertical stems of these wires may be encircled by insulating sleeves 23—23 which serve to space the sealing plug or cover 10 from the plate 22 and consequently, from the upper edges of the battery plates.

While I have herein shown and described a typical embodiment of my invention, it will be understood that this disclosure has been made rather by way of illustration than limitation, and that the invention may be embodied in other forms without departing from the spirit or scope thereof. This invention is a continuation, in part, of my pending application Serial No. 732,446, filed June 26, 1934, for Improvements in storage batteries.

Having thus described my invention, what I desire to claim as new is:

1. A storage battery separator made of balsa wood.

2. A storage battery separator of balsa wood, the original wood structure of which is preserved substantially undamaged but from which the sap and natural wood acids have been removed.

3. In a storage battery, the combination of a container, positive and negative plates located therein, a sulphuric acid electrolyte, wood separators between said plates and cooperating with them to substantially fill the entire internal transverse dimensions of the battery cell in the container, said separators being of the nature of balsa wood and having the characteristics of a semi-permeable membrane in controlling the diffusion of said electrolyte and holding within their structure the greater part of the total volume of the electrolyte required for the normal operation of the battery.

4. In a storage battery, the combination of a container, positive and negative plates located therein, and balsa wood separating said plates and of sufficient volume to hold, within its structure, practically all of the electrolyte required for the normal operation of the battery.

5. In a storage battery, the combination of a container, positive and negative plates located therein, and a balsa wood separator between said plates, said separator conforming to and fitting so tightly against the surfaces of the plates as to substantially reduce the shedding of the active material from those surfaces of the plates in contact with the separator.

6. In a storage battery, the combination of a container, positive and negative plates located therein, and balsa wood separating said plates and cooperating with them to substantially fill the entire internal transverse dimensions of the battery.

7. In a storage battery, the combination with a battery jar having an upright cell therein, two plates located in said cell substantially in contact with the opposite lateral walls thereof, a positive plate of the tubular type located between and positioned parallel to said negative plates but spaced from them, and balsa wood separators fitting snugly between the positive plate and said negative plates and conforming to the surfaces of the plates against which they bear, said separators and plates substantially filling the horizontal cross-sectional dimensions of said cell.

8. In a storage battery, the combination with a battery jar having an upright cell therein, two negative plates located in said cell substantially in contact with the opposite lateral walls thereof, a positive plate located between and positioned parallel to said negative plates but spaced from them, and balsa wood separators fitting snugly between the positive plate and said negative plates and conforming to the surfaces of the plates against which they bear, said cell being provided with shoulders spaced above the inner bottom surface of the jar to support said negative plates.

9. In a storage battery, the combination of a container, positive and negative plates located therein, one of said plates being of tubular form, and a balsa wood separator positioned between said plates and having one side grooved to fit snugly against the surfaces of the latter plate.

10. A storage battery separator made of balsa wood, of at least one-quarter of an inch in thickness, and having its opposite faces shaped to fit snugly against the surfaces of the battery plates between which it is to be located.

11. A storage battery separator made of material of the type of balsa wood.

12. In a storage battery, the combination of a container, positive and negative plates located therein, and a balsa wood separator between each pair of adjacent plates, said separator being of a thickness at least as great as that of the individual plates.

13. In a storage battery including positive and negative plates and a sulphuric acid electrolyte, a wood separator interposed between each pair of plates and conforming to and fitting so tightly against the surfaces of said plates and having such a structure as to prevent any substantial degree of shedding of the active material from said surfaces, said separator being of the nature of balsa wood and having a structure serving so to limit the rate of diffusion of the electrolyte as to control the rush of current on a direct short circuit and to maintain it substantially below the amperage that otherwise would be created, and being of such permeability that the internal resistance of the battery under working conditions will not be abnormally high.

GRANT WHEAT.